United States Patent [19]

Googin et al.

[11] 4,048,980

[45] Sept. 20, 1977

[54] SOLAR RADIATION ABSORBING MATERIAL

[75] Inventors: John M. Googin; Charles R. Schmitt; James M. Schreyer, all of Oak Ridge; Harlan D. Whitehead, Clinton, all of Tenn.

[73] Assignee: The United States of America as represented by the United States Energy Research and Development Administration, Washington, D.C.

[21] Appl. No.: 664,859

[22] Filed: Mar. 8, 1976

[51] Int. Cl.² .................................................. F24J 3/02
[52] U.S. Cl. ..................................... 126/270; 165/133; 138/145; 126/271
[58] Field of Search ................. 126/270, 271; 165/133; 138/145

[56] References Cited

U.S. PATENT DOCUMENTS

| 2,917,817 | 12/1959 | Tabor | 126/270 |
| 3,079,273 | 2/1963 | Johnson | 165/133 |
| 3,129,703 | 4/1964 | Tabor | 126/270 |
| 3,194,228 | 7/1965 | Bangues | 126/271 |
| 3,612,059 | 10/1971 | Ersek | 165/133 |
| 3,958,553 | 5/1976 | Brantley, Jr. | 126/271 |
| 3,968,786 | 7/1976 | Spielberg | 126/270 |
| 3,985,116 | 10/1976 | Kapany | 126/270 |

Primary Examiner—John J. Camby
Assistant Examiner—Henry C. Yuen
Attorney, Agent, or Firm—Dean E. Carlson; Stephen D. Hamel; Allen H. Uzzell

[57] ABSTRACT

Solar energy absorbing means in solar collectors are provided by a solar selective carbon surface. A solar selective carbon surface is a microporous carbon surface having pores within the range of 0.2 to 2 micrometers. Such a surface is provided in a microporous carbon article by controlling the pore size. A thermally conductive substrate is provided with a solar selective surface by adhering an array of carbon particles in a suitable binder to the substrate, a majority of said particles having diameters within the range of about 0.2–10 microns.

10 Claims, 2 Drawing Figures

SOLAR RADIATION ABSORBING MATERIAL

BACKGROUND OF THE INVENTION

This invention was made in the course of, or under, a contract with the Energy Research and Development Administration. This invention in general relates to the art of providing selective solar energy absorbing surfaces for solar collectors and the like.

In general, a solar collector is an apparatus having a collector surface and adapted for absorbing energy from incident solar radiation and conducting the energy as heat to a heat transfer means for transport to the site of ultimate use or conversion to another form of energy. For purposes of this invention, a solar collector is an apparatus comprising in combination means for absorbing energy from incident solar radiation and means for conducting the absorbed energy as heat to the heat transfer means. In solar collectors, the energy absorbing means often is a black coating on a metallic substrate. The metallic substrate also functions as a heat conductive means. The coating in combination with the metallic substrate (usually polished) absorbs energy from incident solar radiation and conducts the energy through the metallic substrate to a circulating heat transfer fluid such as water. An example of a heat conductive substrate provided with a selective solar energy absorbing coating is shown and described in U.S. Pat. No. 3,920,413 issued to James R. Lowry on Nov. 18, 1975. The Lowry patent shows a heat conductive metal surface provided with a selective solar energy absorbing coating of electrodeposited black nickel. The solar selective coating method of the present invention is useful for coating such a metallic substrate as well as a thermally conductive non-metallic coating, and solar collectors coated according to this invention are useful for heating heat transfer fluids for use in heating buildings, generating electricity and other applications.

PRIOR ART

A variety of coatings for absorbing solar energy are known in the prior art. Any black material such as some of the alkyd resin enamels or flat black paints containing high color carbon black pigment will provide a surface with a high solar energy absorbtivity. Unfortunately, such paints are non-selective for solar energy, and they emit much of the absorbed solar radiation as infrared radiation to the surroundings. Solar energy is utilized substantially more efficiently when the coating is solar selective. Solar selective coatings are characterized by a high absorbitivity for visible light and a low emissivity (high reflectivity) for infrared radiation.

Solar selective coatings in the prior art include ceramic enamels containing lead sulfide, chromium oxide, the mixed oxides of copper, or the mixed sulfides of nickel-zinc; and electrodeposited black coatings, such as black chrome, black nickel, black zinc, as well as black copper. These coatings are typically applied as thin (1000–3000A) coatings to metal substrates. The metal substrates are thus treated to lessen infrared emissivity, and the coating and the substrate function as a selective solar absorber.

The chief disadvantage of the prior art solar coatings are the high costs associated with their initial application and maintenance. Coating thickness control is critical to the prior art coatings because for each coating material used there is an optimum thickness range for the ratio of solar energy absorbtivity to solar emissivity. This ratio needs to be kept as high as possible without significant loss in absorbtion in the visible wavelengths to obtain maximum efficiency. As the thickness in these coatings increases above the optimum value, selectivity is lost and the coatings resemble non-selective black paint in properties. Because precise surface preparation and thickness control is essential to the efficiency of these coatings, the cost of the coating operations is often prohibitive. In a November, 1974 NASA technical memorandum; NASA TM-X-71730 "Survey of Coatings for Solar Collectors" N-75-23989, available from the National Technical Information Service, U.S. Department of Commerce, Springfield, Va.; the price of coating surfaces is disclosed. The quoted prices excluded surface preparation and materials cost and ranged from 50 cents per sq. ft. for ALKYD enamel and black copper to 80 cents per sq. ft. for black chrome and black zinc.

Metal surface preparation for prior art coatings methods include sand blasting and abrasive-grit honing, organic solvent washing, anodic surface dissolution cleaning, acid cleaning, preelectroplating, electrolytic alkaline chelating cleaners, rinsing, etc. For paints, the metal surface must be freed of loose oxide, and coating with an anticorrosion coating and primer. Some electodeposition processes require electrodeposition of a metal layer before the black coating. For example, when black chrome is used as a solar-selective coating on steel, the steel needs first to be plated with nickel to prevent the steel from rusting since the black chrome provides no such protection. If black chrome is plated on aluminum, the aluminum either is first plated with nickel, after zincating, or is plated directly with chromium prior to plating with black chrome.

Some of the prior art coatings are subject to ultraviolet deterioration, deterioration by corrosion and contamination, or thermal degradation. Thin electrodeposited black coatings are easily lost by abrasion.

Furthermore, the cost of repairing the prior art coatings is substantially higher since the solar collector must be disassembled and subjected to the expensive surface repreparation and coating processes.

SUMMARY OF THE INVENTION

It is an object of this invention to provide a solar selective surface and coating method requiring substantially reduced material cost and application cost.

It is a further object to provide a solar selective surface and coating method which functions independently from the surface coated and requires no strict thickness control.

It is a further object to provide a coating method with substantially less expensive surface treatment than prior art coatings.

It is also an object to provide a solar collector having a solar selective surface which is easily repairable by non-skilled personnel and without extensive disassembly.

These and other objects are accomplished according to this invention by providing in a solar collector comprising in combination means for absorbing solar energy from incident solar radiation and means for conducting said energy to a heat transfer medium, the improvement wherein said means for absorbing solar energy is provided with a solar selective surface comprising carbon, said surface having a majority of external pores within the range of about 0.2–2 micrometers.

DETAILED DESCRIPTION

Figure 1:
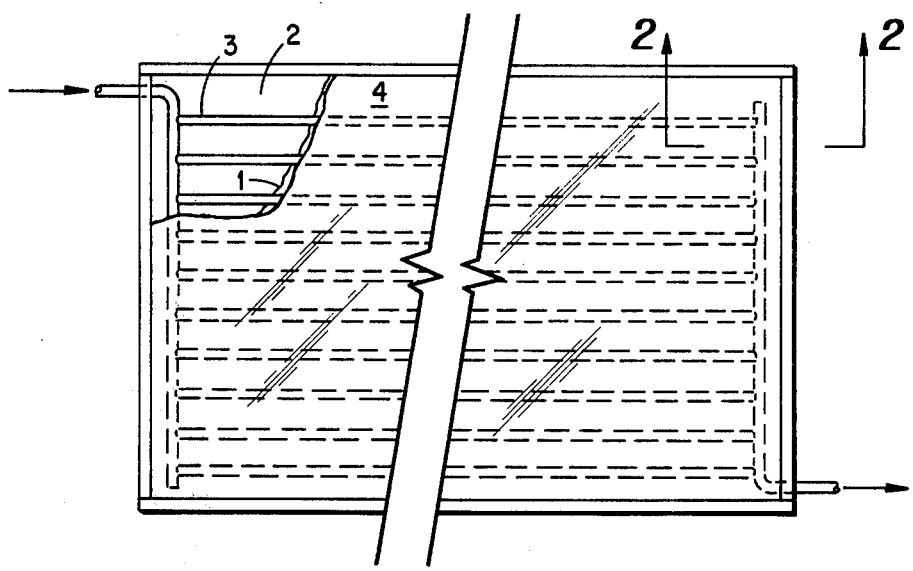

An aspect of this invention is the use as a solar selective surface of a material of high absorbtivity for visible light in a porous configuration capable of reflecting infrared radiation, thereby reducing the thermal emissivity of the surface. Such a surface therefore functions as a "black hole" for visible light and a reflector for infrared radiation. Carbon is a particularly suitable material for this purpose.

It has been found according to this invention that carbon in suitable configuration has solar selective properties comparable to expensive prior art solar selective coatings. A solar selective carbon surface according to this invention is a porous surface having a majority of pores within the range of 0.2-2 micrometers. Such a carbon surface has good absorbtive properties for the visible wavelengths of solar radiation, but acts as a reflector for longer wavelengths of infrared radiation, above about 2 micrometers wavelength. The desired results are achievable in any surface having sufficient pores within the 0.2-2 micrometers range to demonstrate solar selectivity. Though some degree of solar selectivity is demonstrated in coatings having fewer than a majority of pores within the range, the greater the pore fraction within the range of about 0.2-2 micrometers, the more solar selective will be the surface. While the solar selective surface of this invention consists essentially of carbon or carbon particles in a suitable binder, minor amounts of impurities may be present without seriously detracting from the performance of the coating. Types of carbon useful for providing solar selective surfaces of this invention are those forms which have high absorbtivity for visible light, and include amorphous, semigraphitic, and graphitic carbon, as opposed to diamond which is substantially transparent to visible light. Configurations of carbon which demonstrate solar selective properties include solid microporous carbon articles having a majority of surface pores within the range of 0.2-2 micrometers, and an array of carbon particles or fibers having interparticle or interfiber spaces in the range of 0.2-2 micrometers. As used herein, the terms "pore size" or "diameter" referring to pores or particles refers to the equivalent area diameter of the particle or pore (the diameter of a circle having equivalent area as the pore or a planar projection of the particle).

According to this invention, an efficient solar collector is a solid carbon body having a majority of external pores in the range of 0.2-2 micrometers. For purpose of this invention, external pores are those pores on the surface of the carbon body which is exposed to incident solar radiation. Such a carbon body functions as both a solar selective absorber and a thermal conductor; thus an efficient solar collector can be fabricated from such a body equipped with appropriate conduit means for a heat transfer fluid. Smaller carbon bodies, such as carbon or graphite microspheres, having external pores in the 0.2-2 micrometers range are adhered with a suitable binder to a thermally conductive substrate to provide a solar selective surface.

Those skilled in the art of carbon and graphite technology are capable of fabricating a variety of carbon articles having controlled pore size distribution. This is routinely accomplished by varying certain parameters in the manufacturing process. For example, the pore characteristics of a carbon body are ordinarily a function of the pores of the precursor material and the coking temperature. Carbon microspheres having a pore size distribution suitable for providing the solar selective surface of this invention are commercially available or may be prepared by coking commercially available cation exchange resins. Suitable carbon microspheres may be readily prepared by slowly coking polymer beads to about 900° C in flowing nitrogen or inert atmosphere for 48 hours. Suitable polymer beads are crosslinked polystyrene prepared from a polymerization mix containing about 16 mole percent divinylbenzene. There are a variety of methods for making suitable carbon precursor beads in the art.

Typical of such methods is the method for making crosslinked polystyrene beads by the pearl polymerization technique more fully described in *Ion Exchange*, Friedrich Helfferich, McGraw Hill Book Company, New York (1962) pp. 35-37. The pore size is regulated by controlling the degree of crosslinking, which is determined by the divinylbenzene concentration in the polymerization mix. If desired, particle size can be controlled by mechanical agitation, dispersants, and other means such as described in the article "Particle Size in Suspension Polymerization", F. H. Winslow and W. Matreyek; Ind. Eng. Chem. 43 (1951) pp. 1108—1112.

An example of carbon microspheres showing the approximate pore size distribution useful for this invention and a method for making them is described in the article "Carbon Microspheriods As Extinguishing Agents for Metal Fires" by C. R. Schmitt in "The Journal of Fire and Flammability", Vol. 5 (July, 1974) pp. 223-233 which is incorporated herein by reference. Though the pore size shown therein are prephaps slightly larger than desirous for solar selective coatings, controlled heating of the coked particles above about 2000° C will shrink the pore size to the desired range, or the degree of crosslinking in the polystyrene may be increased by increasing the divinylbenzene content in the polymerization mix from about 12 mole percent to about 16 mole percent.

Other solar selective configurations of carbon include carbon fibers or whiskers, such as fibrous graphite, oriented in such a manner as to provide a majority of pores within the range of about 0.2-2 micrometers. For example, fibrous graphite may be prepared by carbonizing and graphitizing rayon fibers and orienting them to a thermally conductive substrate by conventional electrostatic flaccing techniques to provide a brush type configuration. By controlling the spaces between the fibers to a range of about 0.2-2 microns, a solar selective surface is provided by the ends of the fibers. This surface provides "black holes" for visible light while acting as a reflector for infrared radiation. The length of the fibers should be at least 5 to 10 times the interfiber space to provide sufficient visible light trapping.

A particularly useful application of this invention is the art of providing solar selective coatings for thermally conductive surfaces such as in conventional type solar collectors. An inexpensive, easily applied selective coating is a solar selective array of carbon particles in a suitable binder. A solar selective array is a coating of carbon particles of suitable size to provide the proper interparticle spaces about 0.2-2 micrometers to act as reflectors for infrared radiation above about 2 micrometers wavelength and is easily provided by a coating of carbon particles in a suitable binder, a majority of the carbon particles having diameters between about 0.2 micrometers and 10 micrometers. Of course, the greater the majority of particles within the required range, the more efficient will be the array for admitting visible light and reflecting infrared. Enhanced efficiency is achieved when the particles have been fired above about 1900° C.

Accordingly, an effective inexpensive solar collector comprises a collector surface in thermal communication with a heat transfer medium, said surface being provided with a solar selective array of carbon particles for absorbing solar energy from incident solar radiation. An improved coating method for providing a thermally conductive substrate with a selective solar energy absorbing surface, comprises adhering a coating comprising carbon particles to said surface, a majority of said carbon particles having diameters between about 0.2 micrometers and 10 micrometers.

A suitable binder is any ceramic or adhesive material such as the acrylic thermoplastic resins which is capable of adhering the carbon particles together and to the heat conductive surface. Preferred binder materials are those which are transparent to visible light and which are effective in small amounts. The binder should be highly resistant to weathering and to thermal degradation at the operating temperature. The binder should preferably be substantially infrared transparent in the thickness used. Suitable binder materials are readily available and include sodium silicate of high $SiO_2$ to $Na_2O$ ratio, such as sodium silicate after leaching with hydrofluosilicic acid, hydrolyzed ethyl silicate, acrylic resin, phenolic resins, polyester resins, styrene and copolymers, epoxides, and high temperature polymers as adhesives.

The solar selectivity attainable with carbon particles of diameter in the range of 0.2-10 micrometers is believed to be caused by moderately high absorbtion for visible light through the interparticle spaces coupled with a high reflectance for the near infrared radiation (hence low thermal emissivity). It is believed that the array of carbon particles functions as a reflector for infrared in the thermal range, above about 2 micrometers wavelength.

Closely packed particles much below 0.2 micrometers in diameter have interparticle spaces too small for high visible absorbtion, and particles much larger than 10 micrometers are poor infrared reflectors, hence have high infrared emissivity, thereby substantially lessening the solar selectivity of the array of particles.

The carbon particles used in the solar selective array of this invention are readily distinguishable from carbon and lampblack particles used for the production of pigments, such as the channel process and furnace process carbon blacks used in inks and flat black paints. Such high color carbon black particles have particle diameters ranging from 0.02-0.04 microns with low color carbon blacks having particles of 0.06 microns. While coatings such as flat black paints have been used to coat solar panels in the prior art, such coatings are non-solar selective, the particles being too small and too dispersed to act as an infrared reflector. While the overall absorbtivity of such dilute dispersions of particles is high, so is their thermal emissivity, thus they function much as a theoretical black body--high absorbance and high emittance for all wavelengths.

The 0.2-10 micrometer particles used in this invention are sometimes found in graphite paints. They are grey in color and are typically used for their corrosion resistance or high temperature capabilities rather than for their pigment properties or absorbtion properties. The particles useful for providing the solar selective coatings of this invention include low- and medium- thermal thermatomic carbons as well as particles having varying degrees of graphitization, including rough surfaced carbon and graphite microspheres having diameters of about 10 to 50 micrometers. While the diameters of such microspheres generally lie outside the 0.2-10 micrometer range, the microspheres demonstrate solar selectivity due to their surface pore sizes within the 0.2-2 micrometer range.

While efficient solar selective coatings can be made with substantially amorphous thermatomic carbon experiencing temperature no higher than the 100° C of a normal manufacturing process, we have found that a significant improvement in efficiency is achieved when the particles have been fired to above about 1900° C. Above this temperature, third degree ordering (graphitization) takes place in the carbon particles. It is believed that heat treatment of the carbon particles above 1900° C increases their solar efficiency by increasing the degree of crystallinity of the particles. The enhanced efficiency is probably explainable by the more crystalline particles providing a rough surface which refracts and back-reflects the incident solar radiation within the particle array to more efficiently absorb its energy. The increased ordering also enhances the thermal and electrical conductivities.

It appears that any degree of third dimensional ordering or graphitization enhances the efficiency of the carbon particles of this invention for selectively absorbing solar radiation. The coating method of this invention may employ any form of carbon or graphite particles within the proper particle size range, and the scope of this invention is not limited to the examples shown, but only by the claims. Based upon this disclosure, those skilled in the art of graphite and carbon technology can produce a variety of solar selective powders of carbon and graphite of various degrees of graphitization which will demonstrate high efficiency for collecting solar energy.

All that is necessary for providing a selective solar energy absorbing surface on a thermally conductive substrate (such as the collector surface in a solar collector) is that the carbon particles of suitable size be dispersed in a suitable binder and adhered to the surface by brushing, spraying, or any other suitable means, much like applying ordinary paint. The substrate need only be sufficiently clean and dry to provide for satisfactory adherence. An efficient solar collector is provided according to this invention by the combination of an array of carbon particles of suitable size in a suitable binder in thermal communication with a means of conducting absorbed energy as heat to a heat transfer medium.

There are several significant advantages to the coating system of this invention. The high temperature capability of a carbon or graphite coating with a high temperature binder such as silica would make the method of this invention useful for coating a central solar energy receiver such as is proposed for those solar energy systems comprising a plurality of rotatable mirrors focusing on a central receiver tower. Furthermore, the coating method of this invention requires practically no preliminary surface treatment. The thickness of the carbon particle array is not critical. The carbon particle coating may be readily applied in any conventional manner like paint, by untrained personnel. Also, the coating is easily repairable simply by brushing or spraying carbon particles in a suitable binder over the damaged area. Since coating thickness is no longer a critical consideration, a solar collector need not be disassembled to make repairs to the coating.

The amount of binder used in the coating method of this invention should be kept to the minimum necessary for satisfactory adherence, in order that the carbon particles have maximum particle to particle contact for maximum interparticle electrical and thermal conductivities and to provide for the proper interparticle spaces. A preferred method of adhering the carbon particle array to the surface is to brush or spray a mixture of the carbon particles about 70 to 80 wt. % in a suitable volatile vehicle such as methylene chloride containing an acrylic resin binder of about 2 to 5 wt. %. After the vehicle evaporates, the carbon particles remain firmly bound to the surface to provide a solar selective array with only a small amount of binder. This minimum amount of binder will vary with different materials and may be routinely determined for any combination.

The relatively solar selectivity of two coatings may be manifested by their ability to raise the temperature of their respective substrates when exposed to an equal flux of solar radiation. As a demonstration of the efficiency of the solar selective carbon surfaces of this invention an experimental comparison between carbon coatings of this invention with various non-carbon prior art coatings is made.

EXPERIMENTAL

A number of copper test plates, 4 × 4 × 1/16 inch thick, to which various surface coatings were applied were mounted in a foamed plastic test panel and the panel was exposed to sunlight by maintaining it stationary at a constant tilt angle, facing south such that each plate received an equal solar flux density as the sun traversed from east to west. The copper plates were degreased with methylene chloride and cleaned of oxide film by abrading with silicon carbide paper and rinsing with deionized water. After applying te experimental coating to be evaluated, the plates were mounted on the foam-panel test stand by taping a thermistor to its back surface and taping down the exposed edges to its top surface to eliminate heat losses by outside air movement. The thermistors were connected to an electronic data logger capable of measuring the temperature of the plates within 0.01° F. Prior to the coating evaluations, the thermistors were calibrated by placing them collectively into a single black body air cavity and recording the temperature over an eight hour period. The temperature variations between the thermistors was found to be +0.2° F.

Various carbon and non-carbon coatings were applied. The coatings and method of application are described below. The results are presented in table I.

Non-carbon Coatings

1. Hawshaw Standard Black Chrome

This coating was prepared by first plating with approximately 0.0005-inch of dull nickel at 40 amps/ft² for 15 minutes and then overplating with black chrome obtained from Hawshaw Chemical Company, CHROMONYX, at 24 volts and 200 amps/ft². (Ref.: NASA TM-X-71731, May, 1975)

2. Electrodeposited Chromium

This black coating was deposited electrochemically at a temperature of 90°–115° F and a current density of 40–90 amperes/sq. ft. from a solution of the following composition: chromic acid, 33–40 oz/gal; acetic acid, 28.2 oz/gal; and barium acetate 1 oz/gal.

3. Commercial Black Velvet Paint

This coating was obtained from the Decorative Products Division of the 3M Company, St. Paul, Minn. It is part of the "Nextel" Brand Velvet Coating Series 101.

Carbon Coatings

4. Carbon Microspheroids

This coating consisted of carbon microspheroids of approximately minus 50 mesh particle diameter mixed with acrylic resin, in a 95.5 wt. % microsphere to resin ratio. The coating was applied with a vehicle of mixed solvents (methylene chloride, methylethyl ketone, xylene, and methyl isobutyl ketone)

5. Heat-treated Thermax Powder — (fired to 2850° C in inert atmosphere for 30 minutes)

This coating was applied as 18.7 wt. % heat-treated Thermax, (medium, thermatonic carbon having a mean particle diameter of 0.47 micrometers) 0.3 wt. % acrylic resin and 81 wt. % of a mixed solvent containing equal amounts of methyl ehtyl ketone, methylene chloride, methyl isobutyl ketone and xylene. The coating was applied by pressure spraying and was approximately ⅓ mil. thick (0.008 mm.).

6. Dylon Graphite Paste

This coating is a proprietary finely divided graphite suspension used as a commercial high-temperature furnace coating.

7. Non-heat treated Thermax Powder

This coating was applied as 18.7 wt. % unfired Thermax, (medium thermatomic carbon having a mean particle diameter of 0.47 micrometers) 0.3 wt. % acrylic resin and 81 wt. % of a mixed solvent containing equal amounts of methyl ethyl ketone, methylene chloride, methyl isobutyl ketone and xylene. The coating was applied by pressure spraying and was approximately ⅓ mil. thick (0.008 mm.).

Table I

| | Comparative Evaluation of Coatings on Four Inch Test Plates | | | |
|---|---|---|---|---|
| Coating | Air Temp. (° F) | Black Body Temp. (° F) | Specimen Temp. (° F) | Ratio (*) |
| Hawshaw Standard Black Chrome | 84.8 | 102.4 | 133.4 | 2.5 |
| Electrodeposited Chrome | 99.5 | 128.5 | 140.0 | 1.4 |
| Commercial Black Velvet Paint | 76.1 | 84.3 | 90.5 | 1.8 |
| Carbon Microspheroids | 76.1 | 84.3 | 94.6 | 2.3 |
| Heat Treated Thermax Powder | 76.1 | 84.3 | 93.3 | 2.1 |

Table I-continued
Comparative Evaluation of Coatings on Four Inch Test Plates

| Coating | Air Temp. (° F) | Black Body Temp. (° F) | Specimen Temp. (° F) | Ratio (*) |
| --- | --- | --- | --- | --- |
| Dylon Graphite Paste | 101.7 | 127.2 | 150.4 | 1.9 |
| Thermax-non-heat Treated | 101.7 | 127.2 | 143.7 | 1.7 |

*Specimen Temperature − Air Temperature
Black Body Temperature − Air Temperature As indicated in Table I, the carbon based coatings of this invention are comparable in efficiency with commercial selective coatings. The ratio column indicates a measure of the degree of performance compared with a theoretical black body, hence the degree of selectivity of the coatings, since the black body temperature represents the temperature attained with a non-selective coating of 100% absorbtivity.

The following experiment demonstrates the efficiency of non-heat treated Thermax powder, mean particle diameter 0.47 micrometers with respect to commercial standard Black Velvet Paint.

Experimental

Figure 2:
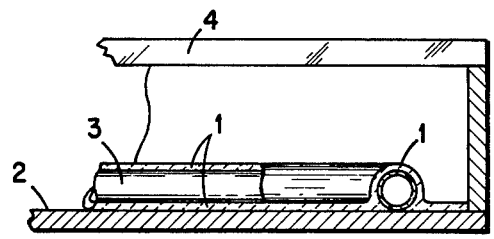

Two solar panels of the type illustrated in FIGS. 1 and 2 were coated with solar selective coatings--one with a surface coating of Black Velvet Paint about 0.125 mm. thick and one spray coated with a fluid mixture comprised of 18.7 wt. % medium thermal carbon particles, 0.47 micrometer average diameter; 0.3 wt. % acrylic resin (Lucite Bead Polymer, E. I. DuPont No. 4FNC99) and 81 wt. % mixed solvents (equal volumes of methylene chloride, methyl ethyl ketone, xylene, and methyl isobutyl ketone). The solvents were allowed to evaporate from the collector surface leaving a carbon powder-acrylic resin film between 0.025 and 0.10 mm. thick.

Each panel had a collector surface area of 10 sq. ft (2 ft. × 5 ft.) and was comprised of a steel plate having steel tubes attached with a copper braze. A total of 8 steel tubes were mounted in a longitudinal direction across the plate. The exposed surface (steel plate, steel tubes, copper braze) was coated with a thin film of copper. Each of the coated panels was mounted in a wooden frame and covered with two 1 mm. thick front face films of polyvinyl fluoride to minimize black reflection from the coating. This film is not necessary for use with carbon based coatings of this invention but was used for comparability. The two films which were separated by an aluminum frame that provided a 1 inch air space between them, were fitted by thermal shrinkage.

The two framed panels were placed side by side in a horizontal position on wooden supports with each coating directed toward the sun. The tubes of the panels were connected to a common water inlet manifold equipped with a thermometer. Two thermistors were installed on each outlet from the panels to provide separate and statistically significant temperature measurements. The thermistors were connected to an electronic data logger. The water flow rate through each collector panel was controlled by valves and rotameters which were periodically calibrated to assure substantially identical flow rates for each panel. The results of these runs are summarized in Tables II and III.

Table II
Solar Radiation Collection Data for Panels Coated With Carbon Particles and Black Velvet Paint

| Time | Ambient Temperature Fahrenheit | Inlet Water Temp. ° F | Outlet Water Temp. ° F | | Water Flow Rate (gal/hr) | | Heat Collected (Btu/hr/ft) | |
| --- | --- | --- | --- | --- | --- | --- | --- | --- |
| | | | Carbon Particles | Black Velvet Paint* | Carbon Particles | Black Velvet Paint | Carbon Particles | Black Velvet Paint |
| 10:20 | 61.8 | 79.2 | 82.0 | 82.0 | 2.35 | 2.35 | 5.5 | 5.5 |
| 10:40 | 63.0 | 79.2 | 91.0 | 91.0 | | | | |
| 10:50 | 64.3 | 77.5 | 90.0 | 90.0 | | | | |
| 11:00 | 64.0 | 77.7 | 90.0 | 90.0 | | | | |
| 11:20 | 68.3 | 85.7 | 110.0 | 109.0 | 2.38 | 2.16 | 48.2 | 42.0 |
| 12:20 | 76.2 | 92.6 | 143.7 | 143.0 | 2.35 | 2.35 | 100.1 | 98.8 |
| 12:40 | 77.1 | 93.4 | 146.0 | 146.0 | | | | |
| 13:00 | 79.4 | 94.0 | 148.1 | 148.0 | | | | |
| 13:20 | 81.3 | 93.6 | 150.5 | 150.2 | 2.31 | 2.28 | 109.6 | 107.6 |
| 13:30 | 83.8 | 93.8 | 151.0 | 150.2 | 2.40 | 2.30 | 114.5 | 108.2 |
| 14:20 | 90.2 | 95.9 | 153.1 | 151.0 | 2.35 | 2.35 | 112.1 | 108.0 |
| 14:25(2) | 89.5 | 96.2 | 153.2 | 150.8 | | | | |
| 14:40(2) | 89.6 | 95.1 | 144.9 | 142.5 | | | | |
| 14:50(2) | 85.3 | 95.3 | 145.9 | 143.0 | 2.31 | 2.25 | 97.5 | 89.5 |
| 15:20 | 95.4 | 95.5 | 140.7 | 139.2 | | | | |
| 15:50 | 93.4 | 94.2 | 134.3 | 133.3 | | | | |

*Average of two measurements on the outlet water
(2)Passing cloud

Table III
Solar Radiation Collection Data for Panels Coated with Carbon Paarticles and Black Velvet Paint

| Time | Ambient Temperature Fahrenheit | Inlet Water Temp. ° F | Outlet Water Temp. ° F | | Water Flow Rate (gal/hr) | | Heat Collected (Btu/hr/ft) | |
| --- | --- | --- | --- | --- | --- | --- | --- | --- |
| | | | Carbon Particles | Black Velvet Paint* | Carbon Particles | Black Velvet Paint | Carbon Particles | Black Velvet Paint |
| 9:40 | 68.8 | 83.3 | 88.3 | 85.4 | 3.2 | 3.2 | 13.4 | 5.6 |
| 10:00 | 73.7 | 80.7 | 96.0 | 89.0 | 3.2 | 3.2 | 40.8 | 22.2 |
| 10:20 | 78.3 | 83.1 | 102.5 | 97.5 | 3.2 | 3.2 | 51.8 | 38.4 |
| 10:40 | 78.8 | 85.5 | 109.9 | 105.1 | | | | |
| 10:45 | 80.4 | 86.4 | 112.6 | 108.4 | | | | |
| 11:00 | 84.2 | 87.4 | 117.0 | 113.8 | | | | |
| 11:20 | 83.4 | 89.6 | 123.7 | 120.8 | | | | |
| 11:40 | 86.6 | 90.0 | 129.1 | 127.0 | | | | |
| 12:00 | 83.8 | 91.8 | 133.4 | 131.9 | | | | |

Table III-continued

Solar Radiation Collection Data for Panels Coated with Carbon Paarticles and Black Velvet Paint

| Time | Ambient Temperature Fahrenheit | Inlet Water Temp. °F | Outlet Water Temp. °F | | Water Flow Rate (gal/hr) | | Heat Collected (Btu/hr/ft) | |
|---|---|---|---|---|---|---|---|---|
| | | | Carbon Particles | Black Velvet* Paint | Carbon Particles | Black Velvet Paint | Carbon Particles | Black Velvet Paint |
| 13:20 | 83.9 | 91.7 | 140.0 | 140.9 | 3.1 | 2.8 | 124.9 | 114.9 |
| 13:40 | 84.6 | 91.6 | 139.2 | 138.1 | 3.1 | 3.1 | 123.1 | 120.2 |
| 14:00 | 87.2 | 93.4 | 139.6 | 136.6 | 3.1 | 3.1 | 118.4 | 111.7 |
| 14:20 | 93.3 | 93.2 | 137.4 | 136.7 | | | | |
| 14:40 | 83.4 | 94.4 | 136.7 | 132.6 | | | | |
| 15:00 | 87.8 | 94.7 | 129.5 | 123.5 | | | | |
| 15:30 | 95.5 | 94.8 | 130.7 | 128.1 | 3.2 | 3.0 | 95.8 | 83.3 |

*Average of two temperature measurements

As seen from the above data, the carbon particles applied according to this invention performed consistently better than did the commercial standard Black Velvet Paint. Furthermore, as indicated in Table III, the carbon-based coating was substantially more effective at lower temperatures than the Black Velvet Paint.

As indicated by the data in Table I, (samples 5 and 7) heat treating carbon particles increases their efficiency for absorbing solar radiation. It is well known in the art that carbon particles, regardless of source, begin to graphitize (show three dimensional ordering) at about 1900° C and continue to graphitize as the temperature is raised above 3000° C. By beginning with carbon decomposition products of various aromatic compounds, a multiplicity of partially graphitized carbons can be produced. According to this invention, substantially superior efficiency is obtained when carbon particles in the 0.2-10 micrometers diameter range are fired above 1900° C.

FIG. 1 is an example of a solar collector in combination with the coating of this invention. This solar collector comprises means for absorbing solar energy from incident radiation, represented by the selective coating of this invention 1 and means for conducting said energy to a heat transfer medium, represented by the panel surface 2 and the tubes 3. Heat transfer fluid passes through the tubes 3 and is heated by the absorbed solar radiation and is transported to the site of ultimate energy utilization. A plastic cover 4 to prevent damage and reduce back reflection may or may not be used. In FIG. 2, an end view of a section of the collector is shown. The coating thickness is much magnified for visualization. Actually the carbon particle coating need be no thicker than necessary to completely cover the heat conductive surface as judged by the naked eye.

The solar selective carbon particle array of this invention may be provided without a binder and without manual application by a variety of vapor deposition processes and by treating the surface with an organic precursor such as partially polymerized furfuryl alcohol.

In another embodiment, an efficient solar collector requiring no coating 1 is provided by a panel surface 2 in combination with tube 3. The surface and tubes are fabricated from carbon having a majority of external pores within the range of 0.2-2 micrometers.

Based upon the teachings of this disclosure, those skilled in the art can undoubtedly fabricate solar selective coatings and articles from non-carbon materials having high absorbance and high conductivity. Such materials are contemplated as equivalents to the forms of carbon used for the method and apparatus of this invention.

What is claimed is:

1. In a solar collector comprising in combination means for absorbing solar energy from incident solar radiation and means for conducting said energy to a heat transfer medium, the improvement wherein said means for absorbing solar energy is provided with a solar selective surface comprising carbon, said surface having a majority of external pores within the range of about 0.2-2 micrometers.

2. The solar collector of claim 1 wherein said means for absorbing solar energy comprises a thermally conductive substrate and said solar selective surface comprises a solar selective array of carbon particles in a binder for adhering said carbon particles together and to said thermally conductive substrate.

3. The solar collector of claim 2 wherein a majority of said carbon particles have diameters within the range of about 0.2-10 micrometers.

4. The solar collector of claim 2 wherein said carbon particles have been fired to above 1900° C.

5. A method of providing a thermally conductive substrate with a selective solar energy absorbing coating, said method comprising adhering a coating comprising carbon particles to said surface, a majority of said carbon particles having diameters within the range of 0.2-10 micrometers.

6. The method of claim 5 wherein said carbon particles are fired to above 1900° C.

7. The solar collector of claim 2 wherein said carbon particles have a majority of external pores within the range of about 0.2-2 micrometers.

8. The solar collector of claim 7 wherein said carbon particles have been fired to above 1900° C.

9. A method of providing a thermally conductive substrate with a selective solar energy absorbing coating, said method comprising adhering a coating comprising carbon particles to said surface, said carbon particles having a majority of external pores within the range of about 0.2-2 micrometers.

10. The method of claim 9 wherein said carbon particles are fired to above 1900° C.

* * * * *